J. CARLSON.
SAFETY AND SANITARY MILK PAIL.
APPLICATION FILED APR. 20, 1918.
1,364,915.
Patented Jan. 11, 1921.
2 SHEETS—SHEET 1.
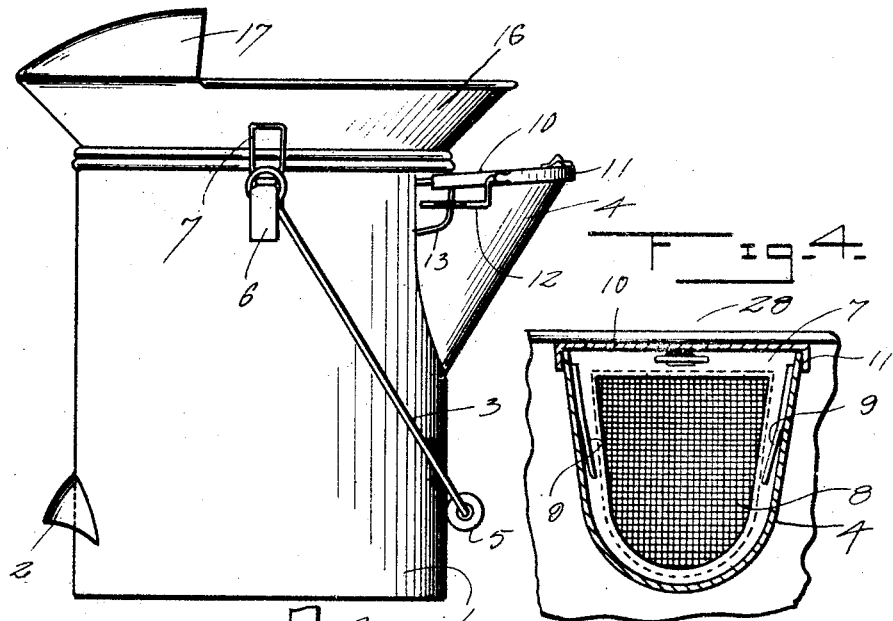
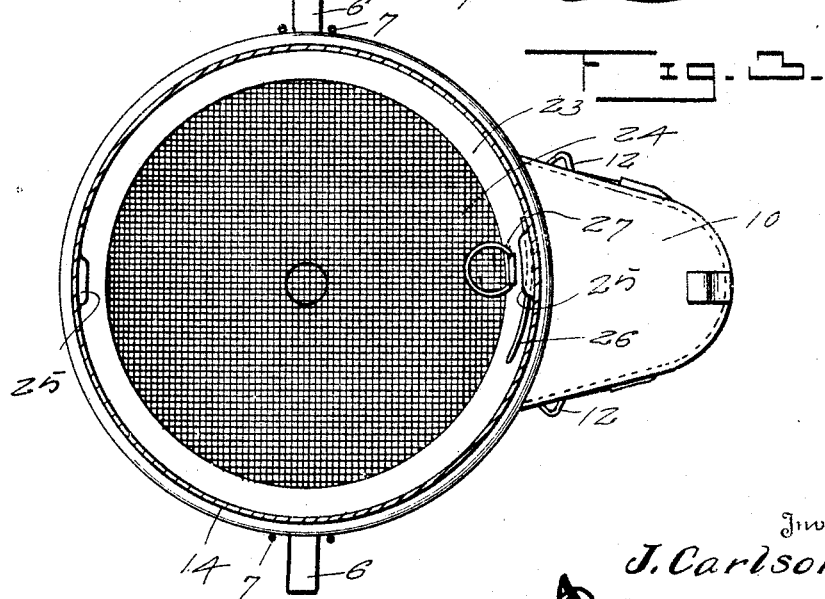
Inventor
J. Carlson J. CARLSON.
SAFETY AND SANITARY MILK PAIL.
APPLICATION FILED APR. 20, 1918.
1,364,915.
Patented Jan. 11, 1921.
2 SHEETS—SHEET 2.
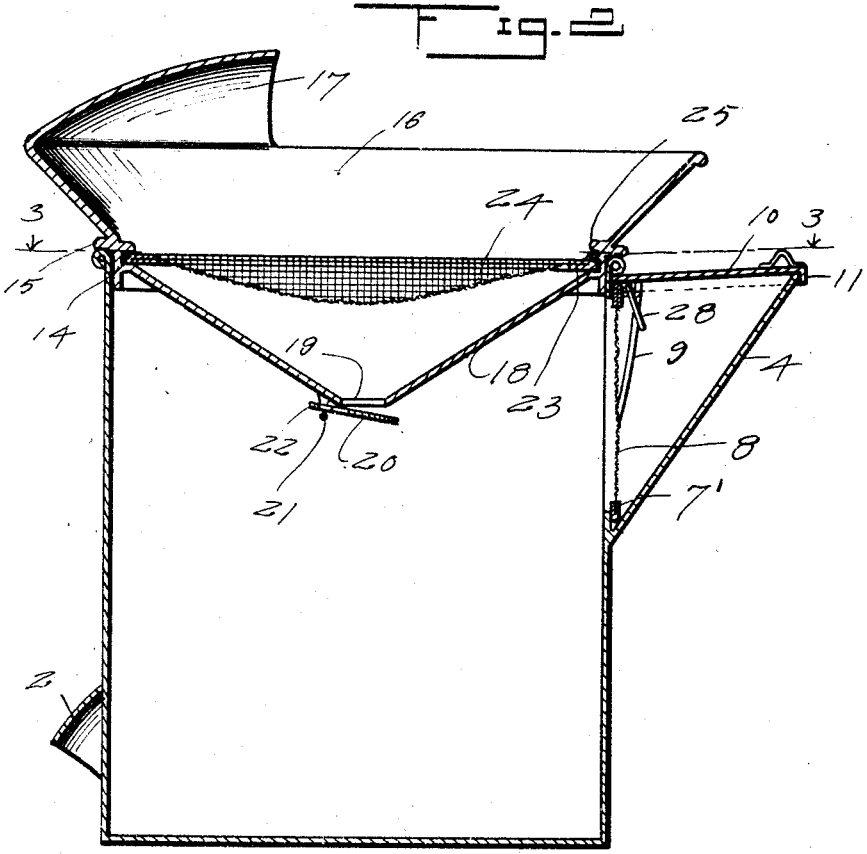
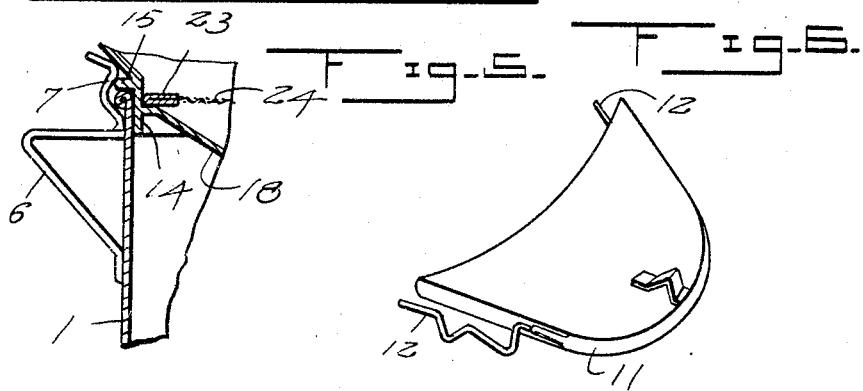
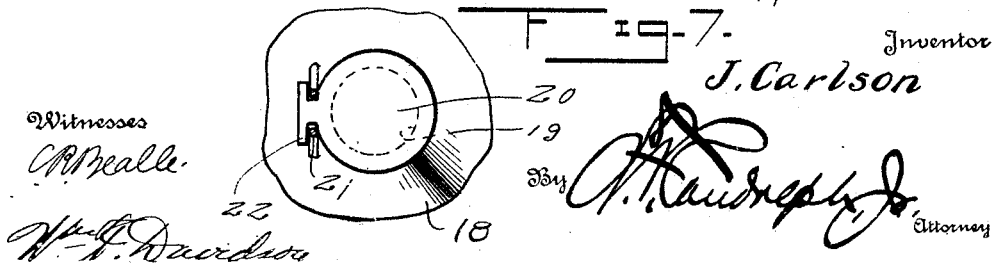
Inventor
J. Carlson
Witnesses
Attorney

UNITED STATES PATENT OFFICE.

JOHN CARLSON, OF SAMUELS, IDAHO, ASSIGNOR OF THIRTY-THREE AND ONE-THIRD PER CENT. TO OSCAR ANDERSON AND FIFTEEN AND TWO-THIRDS PER CENT. TO MATHIAS CARLSON, BOTH OF SAMUELS, IDAHO.

SAFETY AND SANITARY MILK-PAIL.

1,364,915.  Specification of Letters Patent.  Patented Jan. 11, 1921.

Application filed April 20, 1918. Serial No. 229,822.

*To all whom it may concern:*

Be it known that I, JOHN CARLSON, a citizen of the United States, residing at Samuels, in the county of Bonner and State of Idaho, have invented certain new and useful Improvements in Safety and Sanitary Milk-Pails; and I do hereby declare the following to be a full, clear, and exact description of the invention, such as will enable others skilled in the art to which it appertains to make and use the same.

This invention relates to improvements in safety and sanitary milk pails and has for one of its objects the provision of a device of this character whereby the milk will be kept in a strictly sanitary condition during the milking process and which will obviate the danger of spilling the milk from the device if the same is dropped or kicked over by the cow.

Another object of this invention is the provision of means for straining the milk as it enters the receptacle during the milking process and which will be again strained when dispensed from the receptacle.

A still further object of this invention is the provision of a safety and sanitary milk can of the above stated character, which shall be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description, and accompanying drawings, in which:—

Figure 1 is a side elevation of a safety and sanitary milk pail constructed in accordance with my invention, Fig. 2 is a vertical sectional view of the same, Fig. 3 is a transverse sectional view of the device illustrating the strainer for straining the milk as it enters the receptacle, Fig. 4 is a detail sectional view illustrating the strainer adapted to strain the milk as it is dispensed from the receptacle, Fig. 5 is a detail sectional view illustrating the catch for holding the strainer into the receptacle, Fig. 6 is a perspective view of the closure cap for the dispensing spout, and Fig. 7 is a detail view of a valve.

Referring in detail to the drawings, the numeral 1 indicates a cylindrical receptacle having formed adjacent its lower end a finger grip 2 for coöperating with a bail 3 in tilting the receptacle to dispense the contents therefrom through the spout 4. The bail 3 is provided with a hanudle 5 and is connected to ears 6 formed upon the receptacle 1 and which are substantially triangular shape as clearly illustrated in Fig. 5, having secured thereon resilient catches 7. The spout 4 is of substantially U-shape in cross sections as illustrated in Fig. 4 and is in communication with the interior of the receptacle 1. A frame 7' of skeleton formation has secured thereto foraminous material 8 to form a strainer adapted to be positioned within the pouring spout 4 and disposed vertically therein as clearly illustrated in Fig. 2. Springs 9 have one of their ends secured to the frame 7' while their opposite ends are adapted to bear against the walls of the pouring spout for supporting the strainer in a vertical position within the spout and which permits of the strainer being readily removed when desired.

A closure cap 10 has formed thereon flanges 11 adapted to engage the sides of the pouring spout 4 when the closure cap is placed over the open end of the spout.

In applying the closure cap 10 to the spout 4 it is slid over the open end thereof and has formed thereon resilient arms 12 that are adapted to engage over members 13 formed upon the spout 4 for retaining the closure cap in its proper position upon the filling spout.

An annular member 14 is positioned within the upper end of the receptacle and has formed upon its upper edge an annular bead 15 that is adapted to overlie the upper edge of the receptacle 1 to limit the downward movement of the member 14 therein. An upwardly and outwardly inclined flange 16 is formed upon the bead 15 and has formed on a portion thereof a hood 17 for preventing the milk from splashing during the milking process. An inverted frusto-conical shaped member 18 is formed upon the annular member 14 and disposed downwardly within the receptacle and has its apex provided with an opening 19 to permit the milk to pass or drain therefrom into the receptacle during the milking process. A check valve 20 is hinged to the member 18 as illustrated at 21 and is provided with a weighted extension 22 for normally holding the same in a position to close the opening 19, but will permit the valve 20 to move downwardly under the weight of the milk within the inverted frusto-conical shaped member 18 so that the same can readily drain into the receptacle.

A ring 23 carrying foraminous material 24 is positioned upon the inverted frusto-conical shaped member 18 at its point of formation to the annular member 14 for the purpose of forming a strainer to the milk as the same is milked into the receptacle. The foraminous material 24 is slightly dished as clearly illustrated in Fig. 2 to permit the milk to readily drain or pass therethrough into the inverted frusto-conical shaped member 18 during the milking process.

Inwardly directed and oppositely disposed shoulders 25 are formed upon the annular member 14 and arranged in spaced relation to the upper edge of the inverted frusto-conical shaped member 18 and are adapted to overlie the ring 23 when positioned upon the inverted frusto-conical shaped member 18. The ring member has secured thereto a spring 26 which is adapted to be disposed under one of the shoulders or lugs 25 for holding the ring or strainer in its proper position. The ring 23 is provided with a suitable finger grip 27 whereby the strainer may be readily gripped and removed from the device when desiring to clean the same. The strainer within the pouring spout 4 is also provided with a finger grip 28 for aiding in removing the same.

From the foregoing description taken in connection with the accompanying drawings, it will be noted that the milk when entering the receptacle will be entirely strained by the strainer located within the inverted frusto-conical shaped member 18 so as to remove all foreign matter therefrom and that the milk will be again strained when dispensed from the receptacle through the pouring spout 4. It is also to be noted that the milk will be prevented from spilling from the receptacle 1 owing to the closure cap 10 and the valve 20 in case the receptacle is tipped over.

While I have shown and described the preferred embodiment of my invention, it will be understood that minor changes in construction, combination and arrangement of parts may be made without departing from the spirit and scope of the invention as claimed.

Having thus described my invention, what I claim is:—

A sanitary milk pail including a cylindrical receptacle, an annular member engaging the wall of said receptacle, a right angled annular flange formed on the upper edge of said member and resting on the upper edge of said receptacle, an upwardly and outwardly extending flange formed on the top face of the annular flange, a hood on said second flange, a frusto-conical shaped member formed on the annular member and depending downwardly in the receptacle and having an opening in its apex, a strainer resting on the frusto-conical shaped member and against the annular member, lugs formed on the inner face of the annular member and overlying the edge of the strainer, and tension members secured to the strainer and disposed under the lugs.

In testimony whereof I affix my signature in presence of two witnesses.

JOHN CARLSON.

Witnesses:
 JOHN RAGNAN,
 J. ED. JOHANSON.